Jan. 11, 1927.
R. Z. BALL
1,613,867
TORTILLA MACHINE
Filed March 2, 1921 2 Sheets-Sheet 2
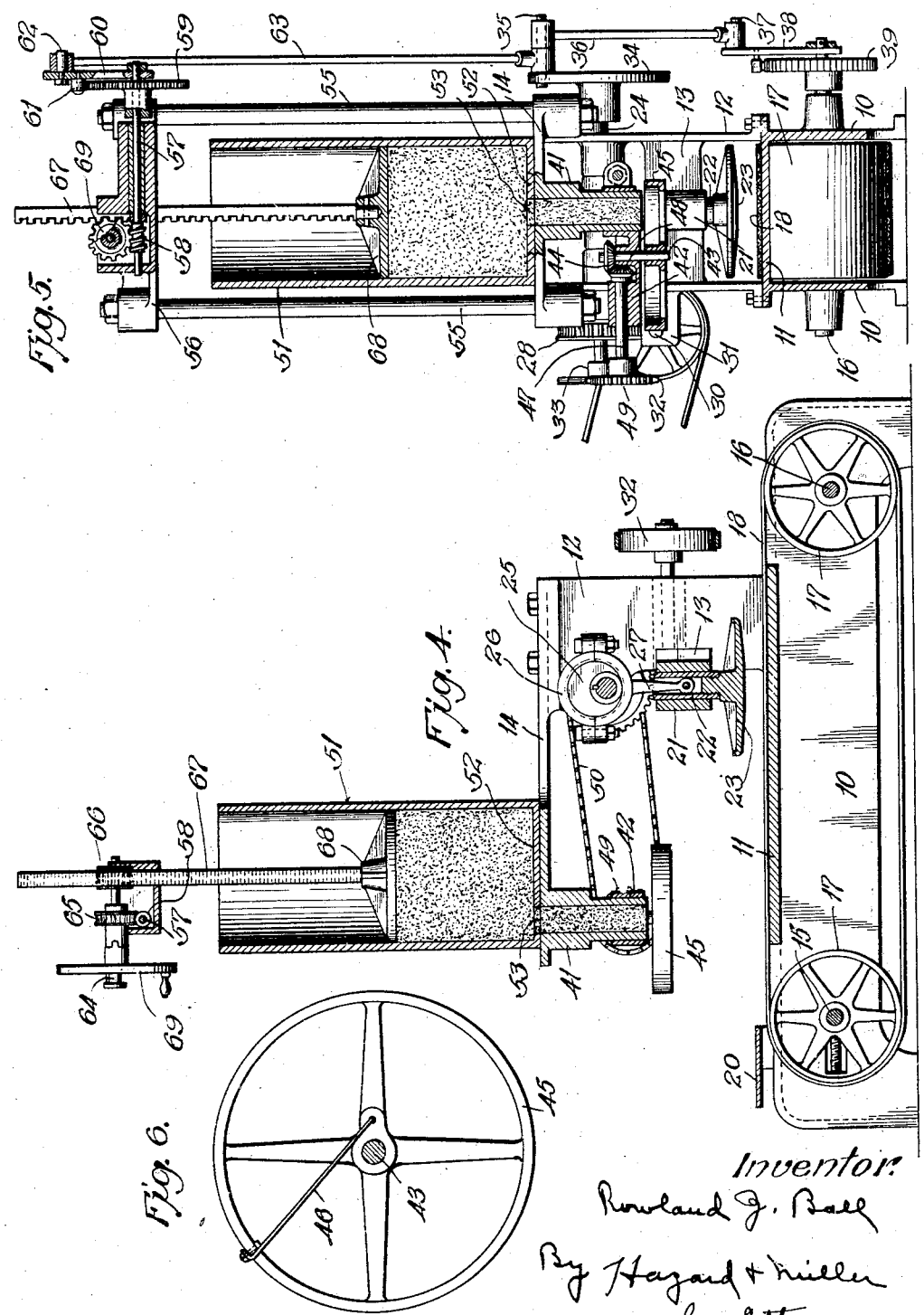
Inventor:
Rowland J. Ball
By Hazard & Miller
his Attys Patented Jan. 11, 1927.

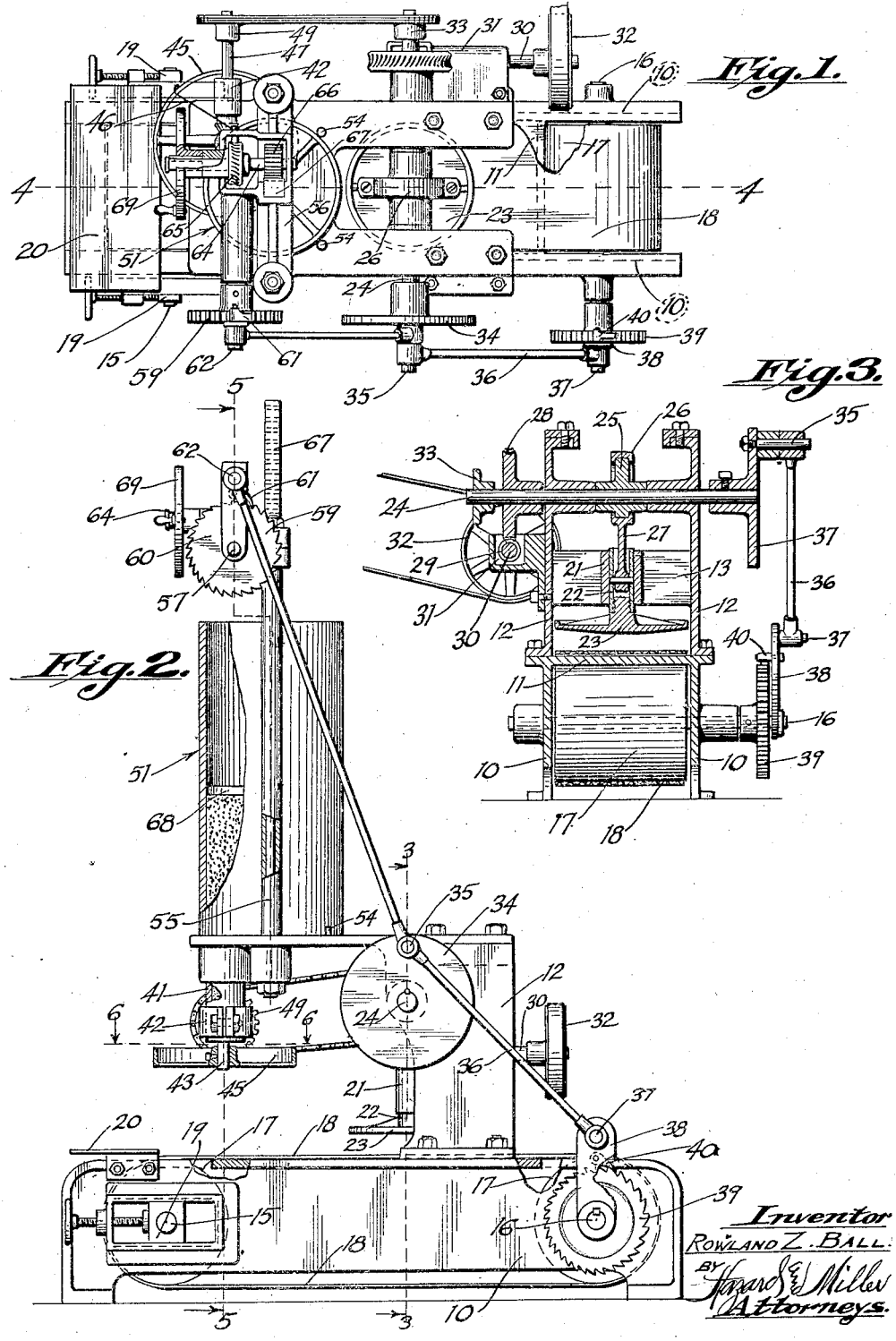

1,613,867

UNITED STATES PATENT OFFICE.

ROWLAND Z. BALL, OF LOS ANGELES, CALIFORNIA.

TORTILLA MACHINE.

Application filed March 2, 1921. Serial No. 449,088.

My invention relates to new and useful improvements in machines for forming tortillas, the principal object of my invention being to provide a relatively simple, strong and durable machine that can be operated with an expenditure of comparatively little power and which will be effective in rapidly forming disc-like bodies of ground corn dough, and which bodies are subsequently baked to form a food product known as tortillas.

With the foregoing and other objects in view, my invention consists in certain novel features of construction and arrangement of parts that will be hereinafter more fully described and claimed, and illustrated in the accompanying drawings, in which—

Figure 1 is a top plan view of a tortilla forming machine of my improved construction.

Fig. 2 is a side elevational view of the machine with parts thereof broken away and in section.

Fig. 3 is a cross section taken on the line 3—3 of Fig. 2.

Fig. 4 is a vertical section taken approximately on the line 4—4 of Fig. 1.

Fig. 5 is a vertical cross section taken approximately on the line 5—5 of Fig. 2.

Fig. 6 is an enlarged horizontal section taken approximately on the line 6—6 of Fig. 2.

Referring by numerals to the accompanying drawings which illustrate a practical embodiment of my invention, 10—10 designate the side walls of the machine base and 11 a bed plate that is positioned between the upper portions of said side walls. Projecting upwardly from the base structure thus formed and adjacent to one end of the bed plate is a frame that includes a pair of side plates 12, a transverse plate 13, and a top plate 14, which latter projects a substantial distance away from the side plates 12 and over the bed plate 11. Journaled for rotation in suitable bearings in the walls 10 adjacent to the ends thereof are transversely disposed shafts 15 and 16, the same carrying drums 17 upon which operates an endless carrier, such as a belt 18. The overrunning portion of this belt passes directly across the top of plate 11. The bearings 19 for shaft 15 are mounted so that they may be adjusted toward or away from the bearings for shaft 16, thereby enabling the belt 18 to be tightened to the desired degree.

Positioned above the end of the base frame in which shaft 15 is journaled is a horizontally disposed plate 20 that serves as a support for the pieces of dough as the same are cut by my improved machine before they are pressed into proper form for baking.

Formed on the central portion of transverse plate 13 is a vertical bearing 21 in which is arranged for sliding movement a tubular member 22, and detachably secured to the lower end thereof is a combined pressing and forming plate 23, the same being in the form of a disc and having a convex under surface.

Journaled in suitable bearings that are formed on the upper portions of plates 12 and above the bearings 21 is a transversely disposed shaft 24 on the center of which is fixed an eccentric 25, and encircling the same is a split ring or yoke 26, and depending from the lower portion of this ring or yoke is a connecting rod 27, the lower end of which is pivotally connected to tubular member 22.

Fixed on shaft 24 near one end thereof is a worm wheel 28 that meshes with the worm 29, and the latter being fixed on a horizontally disposed shaft 30 that is journaled in suitable bearings on a bracket 31. This bracket is fixed to one of the plates 12, and fixed on one end of the shaft 30 is a belt driven wheel or pulley 32. Fixed on the end of shaft 24 adjacent to worm wheel 28 is a sprocket wheel 33. Fixed on the opposite end of shaft 24 is a disc 34, from the outer face of which projects a wrist pin 35, and journaled thereupon is the upper end of a connecting rod 36, the lower end of which is journaled on a wrist pin 37 that projects outwardly from an arm 38, the lower end of which latter is loosely mounted on the corresponding end of shaft 16. Fixed on shaft 16 adjacent to this arm 38 is a ratchet wheel 39, and carried by arm 38 is a pawl 40, the point of which engages the teeth of said ratchet wheel.

Depending from the end of plate 14 is a tubular discharge spout 41, and clamped on the lower end thereof is the inner end of a horizontally disposed bracket 42. Journaled in a bearing that is formed on this bracket intermediate its ends is a short vertically disposed shaft 43, the upper end of which carries a beveled pinion 44, and the lower end carrying a wheel 45, and the upper portion of the latter being provided with a horizontally disposed cutting member 46, such as a wire, the same extending from the hub of the wheel to the rim thereof (see Fig. 6).

Journaled in a suitable bearing on the outer portion of bracket 42 is a horizontally disposed shaft 47, the inner end of which carries a beveled pinion 48 that meshes with pinion 44, and the outer end of said shaft carrying a sprocket wheel 49 upon which operates a sprocket chain 50, and the latter also operating around sprocket wheel 33.

Removably positioned upon that portion of the plate 14 from which discharge spout 41 depends is a cylinder 51 having a removable bottom plate 52, and the latter being provided with an opening 53 that is adapted to register with the passageway through discharge spout 41. Cylinder 51 is maintained in proper position upon plate 14 by the engagement of its lower edge with lugs or projections, such as 54, that project upwardly from said plate.

Fixed to the sides of plate 14 are the lower ends of vertically disposed rods 55, the upper ends of which are connected by a cross piece 56, and the latter being slightly offset or disposed to one side of the axis of cylinder 51 when the same is properly positioned upon plate 14.

Arranged for rotation in suitable bearings in cross piece 56 is a horizontally disposed shaft 57, the inner end of which carries a worm 58, and the outer end carrying a ratchet wheel 59. Loosely arranged on the end of shaft 57 outside the ratchet wheel is the lower end of an arm 60, and mounted thereupon is a pawl 61, the point of which is adapted to engage the teeth of the ratchet wheel 59. Pivotally mounted on a wrist pin 62 that projects from arm 60 is the upper end of a rod 63, the lower end of which is journaled on wrist pin 35.

Mounted for rotation in bearings on cross piece 56 and disposed at right angles to shaft 57 is a shaft 64, the same carrying a loosely mounted worm wheel 65 that meshes with worm 58. Fixed on this shaft 64 is a pinion 66 that meshes with the teeth of a vertically disposed rack bar 67, the same being arranged for sliding movement through a suitably located opening in cross piece 56, and the lower end of said rack bar carrying a plunger or pressure plate 68 that is adapted to slide vertically through cylinder 51. Splined upon the outer portion of shaft 64 so as to move lengthwise thereupon and to rotate therewith is the hub of a disc or hand wheel 69, and the inner face of said hub is notched or toothed so as to interengage or clutch with the correspondingly notched end of the hub of worm wheel 65.

By virtue of this construction the wheel 69 when moved inwardly engages the hub of worm wheel 65 so that both parts rotate with shaft 64, but when hand wheel 69 is pulled outwardly on shaft 64 away from the hub of the worm wheel and said hand wheel is manually rotated said shaft 64 will be rotated independently of said worm wheel, such operation being performed when it is desired to quickly retract or elevate rack bar 67 and pressure plate 68 carried thereby.

In the operation of my improved tortilla forming machine the cylinder 51, that is filled with dough or ground corn mixture from which the tortillas are formed, is placed on plate 14 with its lower edge against the stop lugs 54 and with the plate 52 in the bottom of said cylinder below the mass of dough or material therein. Plate 68 is positioned in the upper portion of the cylinder on top of the body of dough and hand wheel 69 is moved inwardly so that its hub interlocks with the hub of worm wheel 65. The machine is now driven by the application of a power driven belt to pulley 32, and the rotary motion thus imparted to shaft 30 is transmitted to shaft 24 through worm 29 and worm wheel 28. As shaft 24 is rotated, eccentric 25, yoke 26 and connecting rod 27 impart reciprocating movement to tubular member 22 and to the combined forming and pressing plate 23, so that the latter intermittently moves downwardly toward belt or endless carrier 18, and the parts being arranged so that when the pressure plate is at its lowermost limit of movement there is a slight space between its convex under face and the top surface of the belt, and which space represents the thickness of the tortilla when properly formed.

The continuous rotary movement of shaft 14 is converted into intermittent rotary motion and so transmitted to shaft 16 through parts 34, 35, 36, 37, 38, 40 and 39, and as a result the over-running portion of endless carrier 18 is intermittently moved over plate 11, the direction of movement being from the drum carried by shaft 15 toward drum carried by shaft 16, consequently, the tortilla material that is placed on the carrier adjacent to plate 20 will be carried in a position beneath the forming and pressing plate 23 where it will be engaged by the latter on its downward movement.

The rotary motion of shaft 24 will be converted into intermittent rotary motion and so transmitted to shaft 57 through the parts 34, 35, 63, 62, 61 and 59, and as said shaft 57 is thus intermittently rotated corresponding movement will be imparted to shaft 64 through worm 58 and worm wheel 65. As shaft 64 is thus intermittently rotated intermittent downward movement will be imparted to rack bar 67 by pinion 66 that is carried by said shaft 64, it being understood that worm wheel 65 is locked to shaft 64 so as to rotate therewith by the hub of hand wheel 69. As pressure plate 68 moves downwardly in cylinder 51 it will force the tortilla material downwardly through said cylinder and likewise downwardly through discharge spout 41, and that portion of the material that projects below the lower end of said spout will be cut off by wire 46 that is carried by wheel 45. This wheel is rotated as a result of the driving engagement between pinions 44 and 48 and the sprocket chain 50 that operates on sprocket wheels 33 and 49, said sprocket wheel 33 being carried by shaft 24.

The machine attendant occupies a position at the side of the machine adjacent to plate or table 20, and as a lump or piece of tortilla forming material is cut off by wire 46 it will drop downwardly between the spokes of wheel 45 and will be received by the hand of the attendant and transferred onto a sheet of oiled paper which the attendant has previously placed on top of plate or table 20. A second sheet of oiled paper is now placed on top of the piece of tortilla forming material, and said material, with the sheets of oiled paper on top and bottom thereof, is now placed on top of the endless carrier at a point between the table 20 and the combined forming and pressing plate 23. On the subsequent actuation of arm 38 carrying pawl 40, ratchet wheel 39 and drum that is carried by shaft 16 will be rotated, thereby moving the over-running portion of the conveyor 18 across the plate 11 and the tortilla with its sheets of oiled paper thereupon will be brought into position directly beneath the plate 23. At this point in the sequence of operations eccentric 25 will swing downward, with the result that plate 23 is moved downwardly into engagement with the sheet of oiled paper on top of the tortilla forming material, and the latter will be pressed into disc-like form between the sheets of oiled paper, and by virtue of the convex contour of the under side of plate 23 the top surface of the formed tortilla will be slightly concave.

During the time that the tortilla is thus being pressed to shape the carrier 17 remains stationary, and during the succeeding movement of the pressure plate the carrier will again be actuated to carry the formed tortilla from a position beneath the forming plate, and at the same time carrying a lump of dough or material into position beneath said forming plate. After the tortillas have thus been formed they are removed from the discharge end of the carrier and placed in suitable baking pans.

When plate 68 has reached the lower end of cylinder 51 and practically all of the tortilla forming dough or material has been forced out of said cylinder the operator, in order to remove and refill the said cylinder or to place another filled cylinder in position on the table 14, engages hand wheel 69 and draws the same to the outer end of shaft 64, thereby disengaging the clutch connection between the hub of said wheel and the hub of loosely mounted worm wheel 65, and by rapidly rotating the hand wheel corresponding rotary motion is imparted to shaft 64 and pinion 66, thereby quickly elevating rack bar 67, and pressure plate 68. When the plate 68 has been elevated to a position above the top of the empty cylinder the latter can be readily removed from table 14 and another filled cylinder may be positioned on said table, or the empty cylinder may be refilled with tortilla forming material and replaced on said table. Obviously, to reset the parts for operation it would be necessary to move hand wheel 69 inwardly to re-engage the hub of worm wheel 65, and when the machine is again started the rack bar and pressure plate will be slowly moved downwardly to effect a discharge of the tortilla forming material from the lower end of spout 41.

If desired, the under side of combined forming and pressing plate 23 may be perfectly flat and a portion of plate 11 immediately below said pressure plate may be made slightly convex, thereby forming a corresponding slight concavity in the under side of the formed tortilla, or, by forming the pressure plate 23 as shown and providing plate 11 with a slightly convex portion, both faces of the disc-like tortilla body will be concaved.

A tortilla forming machine of my improved construction is comparatively simple, can be operated with relatively little power, and said machine is very effective in the rapid production of tortillas, and which latter, when formed, are uniform in size and shape.

It will be readily understood that minor changes in the size, form and construction of the various parts of my improved tortilla forming machine may be made and substituted for those herein shown and described without departing from the spirit of my invention, the scope of which is set forth in the appended claims.

I claim as my invention:

1. In a tortilla forming machine, a support, a container removably positioned upon said support, a spout depending from said support independent of the container, means adapted to move intermittently through the container and press the material therefrom through said spout, and rotary means disposed adjacent to the discharge end of said spout for cutting the material as it discharges from said spout into pieces of uniform size.

2. In a tortilla machine, a top plate having a flat surface, a spout depending therefrom having a rotary cutter rotating in a horizontal plane at the mouth of the spout, a removable cylinder having an opening in the base over the discharge spout, means to center said cylinder, a cross shaft supported above the cylinder, a pressure plate mounted in the cylinder having a rack bar connected thereto, gearing between the cross shaft and the rack plate, a main shaft, means continuously rotating the cutter from the main shaft and means operative by the main shaft connected to the cross shaft to intermittently operate said cross shaft to thereby intermittently operate the pressure plate to press material out of the cylinder through the spout of the cutter.

3. In a tortilla machine as claimed in claim 2, having in addition a ratchet wheel carried by the cross shaft, a loose arm having a pawl swivelling on said shaft, a disc on the main shaft and a rod connected from the disc to the loose arm to operate the pawl by the rotation of the disc.

4. In a tortilla machine as claimed in claim 2, having in addition a bracket secured to the spout, a short vertical shaft mounted therein having a wheel with a cutter at the lower end of said shaft and gearing from said shaft to the main shaft.

In testimony whereof I have signed my name to this specification.

ROWLAND Z. BALL.